United States Patent
Kline et al.

(10) Patent No.: US 10,954,679 B2
(45) Date of Patent: Mar. 23, 2021

(54) DYNAMIC PLATFORM CREATION

(71) Applicant: International Business Machines Corporation, Armonk, NY (US)

(72) Inventors: Eric V. Kline, Rochester, NY (US); Sarbajit K. Rakshit, Kolkata (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 274 days.

(21) Appl. No.: 16/005,101

(22) Filed: Jun. 11, 2018

(65) Prior Publication Data
US 2019/0376302 A1 Dec. 12, 2019

(51) Int. Cl.
*B64C 27/20* (2006.01)
*E04G 27/00* (2006.01)
(Continued)

(52) U.S. Cl.
CPC .............. *E04G 27/00* (2013.01); *B64C 27/08* (2013.01); *B64C 39/024* (2013.01); *E01F 1/005* (2013.01); *E04G 1/15* (2013.01); *E04G 1/22* (2013.01); *G05D 1/0027* (2013.01); *G05D 1/104* (2013.01); *G06K 9/0063* (2013.01); *B64C 2201/024* (2013.01); *B64C 2201/027* (2013.01); *B64C 2201/108* (2013.01); *B64C 2201/143* (2013.01)

(58) Field of Classification Search
CPC ........ E04G 27/00; E04G 1/15; G05D 1/0027; B64C 27/08; B64C 27/20
See application file for complete search history.

(56) References Cited

U.S. PATENT DOCUMENTS 5,833,386 A 11/1998 Rosan et al.
6,173,653 B1 1/2001 Edelmann
(Continued)

FOREIGN PATENT DOCUMENTS

EP 3032001 A1 6/2016

OTHER PUBLICATIONS

Anonymous, "Modular Platforms", Fibergrate Composite Structures Inc, 2005, Online retrieve at URL:<http://blog.pes-solutions.com/wp-content/uploads/2014/07/Modular-Platforms.pdf>, 2 pages.
(Continued)

*Primary Examiner* — Richard G Davis
(74) *Attorney, Agent, or Firm* — Cantor Colburn LLP; Tihon Poltavets

(57) ABSTRACT

A modular platform is provided and includes a platform having upper and lower surfaces. The modular platform further includes one or more propulsion units, mesh coverings, jack elements and a lock mechanism. The one or more propulsion units are embedded within the platform to generate upward thrust. The mesh coverings overlay each of the one or more propulsion units in the upper surface. The jack elements are coupled to the lower surface and support the platform above an underlying substrate. The lock mechanism connects the platform to a neighboring platform. A power storage unit is embedded in the platform and powers the one or more propulsion units, the jack elements and the lock mechanism. A control unit is embedded in the platform and controls operations of the one or more propulsion units, the jack elements and the lock mechanism.

20 Claims, 5 Drawing Sheets

(51) Int. Cl.
  *E01F 1/00* (2006.01)
  *E04G 1/22* (2006.01)
  *E04G 1/15* (2006.01)
  *B64C 39/02* (2006.01)
  *B64C 27/08* (2006.01)
  *G05D 1/10* (2006.01)
  *G06K 9/00* (2006.01)
  *G05D 1/00* (2006.01)

(56) References Cited

U.S. PATENT DOCUMENTS

| | | | |
|---|---|---|---|
| 8,123,001 B1 | 2/2012 | Apostolopoulos et al. | |
| 9,506,248 B1* | 11/2016 | Fields | E04H 15/56 |
| 2011/0130636 A1 | 6/2011 | Daniel et al. | |
| 2012/0158215 A1* | 6/2012 | Sun | B64C 27/20 |
| | | | 701/3 |
| 2014/0277854 A1 | 9/2014 | Jones et al. | |
| 2014/0374532 A1* | 12/2014 | Duffy | G05D 1/104 |
| | | | 244/2 |
| 2016/0378108 A1* | 12/2016 | Paczan | G06Q 10/083 |
| | | | 705/330 |
| 2017/0131727 A1 | 5/2017 | Kurdi et al. | |
| 2017/0275888 A1 | 9/2017 | Honeycutt et al. | |
| 2018/0061249 A1 | 3/2018 | Cui et al. | |
| 2018/0075605 A1 | 3/2018 | Jia et al. | |
| 2019/0066524 A1* | 2/2019 | Zhang | G08G 5/0078 |
| 2019/0291855 A1* | 9/2019 | Wang | B64C 27/08 |

OTHER PUBLICATIONS

Anonymous, "Rescue Robot", Downloaded 2018, URL<https://en.wikipedia.org/wiki/Rescue_robot>, Wikipedia, 6 pages.
Anonymous, "Road Maintenance Activities, Temporary Haul Roads and Borrow Sites", Downloaded 2018, Online URL<http://www.wrcog.cog.ca.us/DocumentCenter/Home/View/94>, 8 pages.
Anonymous, Downloaded 2018, Online URL<https://www.facebook.com/thisisinsiderdesign/videos/545478652460435/>.
Nosowitz, "Meet Japan's Earthquake Search-and-Rescue Robots", 2011, Popular Science, 2 pages.

* cited by examiner

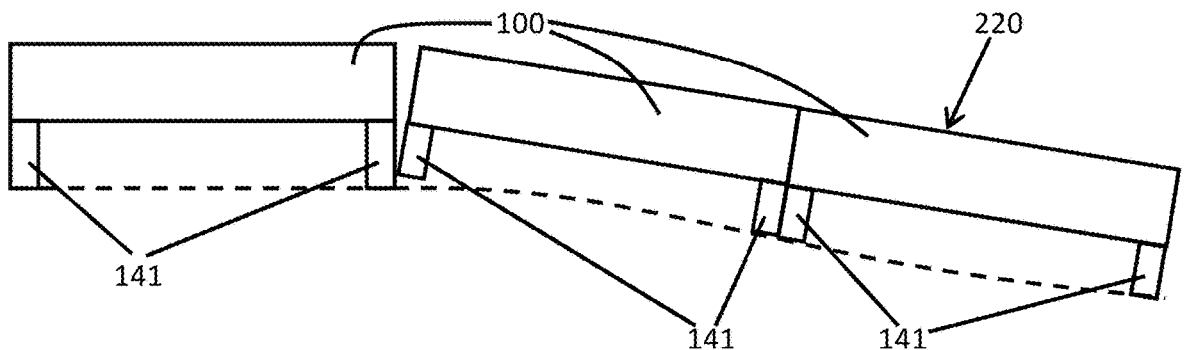
FIG. 5
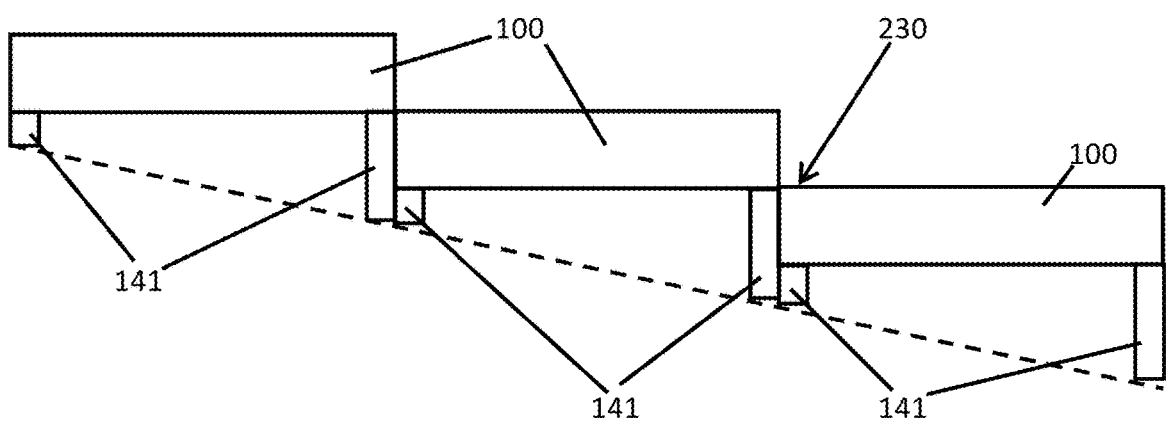
FIG. 6
FIG. 7
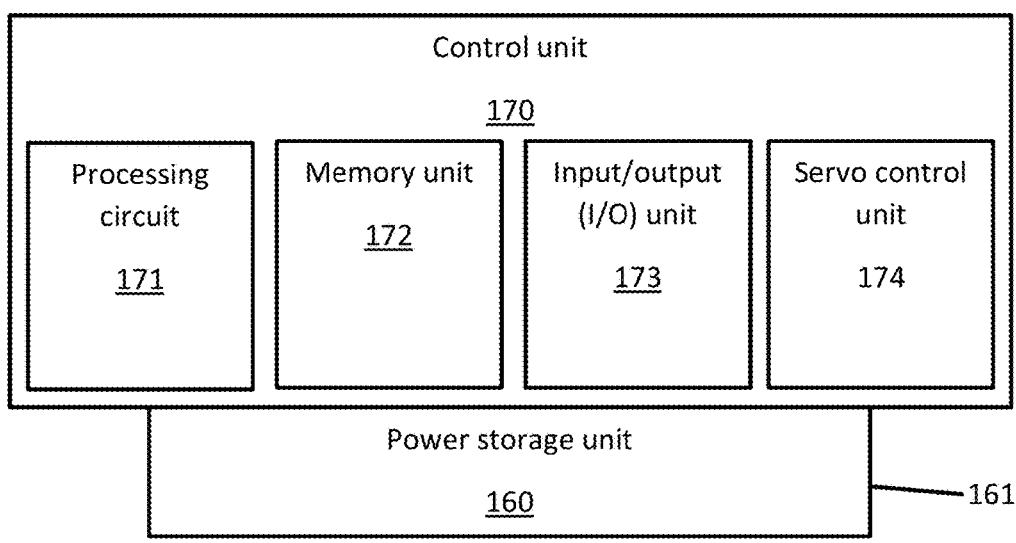

301

DYNAMIC PLATFORM CREATION

BACKGROUND

The present invention generally relates to platforms and, more specifically, to dynamic platform creation.

Disaster areas are often present after major events, such as earthquakes, hurricanes, tornados, and wars. The disaster areas are typically characterized as having casualties and large amounts of rubble. The large amounts of rubble can be unsteady and can block access pathways. The passage of rescue and clean up vehicles is thus made difficult if not impossible. For example, if a city block is destroyed in an earthquake, the rubble from the buildings can block all the surrounding roads and make it very hard for rescue vehicles to gain access to the interior of the city block to remove rubble and to save people who may be trapped.

SUMMARY

Embodiments of the present invention are directed to a modular platform. Non-limiting embodiments of the modular platform include a platform having upper and lower surfaces. The modular platform can further include one or more propulsion units, mesh coverings, jack elements and a lock mechanism. The one or more propulsion units are embedded within the platform to generate upward thrust. The mesh coverings overlay each of the one or more propulsion units in the upper surface. The jack elements are coupled to the lower surface and configured to support the platform above an underlying substrate. The lock mechanism is configured to connect the platform to a neighboring platform. The modular platform can further include a power storage unit and a control unit. The power storage unit is embedded in the platform and configured to power the one or more propulsion units, the jack elements and the lock mechanism. The control unit is embedded in the platform and configured to control operations of the one or more propulsion units, the jack elements, and the lock mechanism.

Embodiments of the present invention are directed to a modular platform swarm. Non-limiting embodiments of the modular platform swarm include multiple modular platforms. Each of the multiple modular platforms includes a platform, multiple rotors, mesh coverings, jack elements and a lock mechanism. The multiple rotors are embedded within the platform to generate upward thrust offset from a center of gravity of the platform. The mesh coverings cover each of the multiple rotors. The jack elements are configured to support the platform above an underlying substrate. The lock mechanism is configured to connect the platform to a neighboring substrate. Each of the multiple modular platforms further includes a power storage unit embedded in the platform and configured to power the multiple rotors, the jack elements and the lock mechanism and a control unit configured to control operations of the multiple rotors, the jack elements, and the lock mechanism. The control units of the multiple modular platforms are inter-communicative and configured to autonomously arrange the platforms of the multiple modular platforms to form a traversable platform surface.

Embodiments of the invention are directed to an autonomous operating method of a swarm of multiple modular platforms. Non-limiting embodiments of the autonomous operating method include visually observing an area of uneven and unknown topography, generating a topographic map of the area and analyzing visual observations of the area and the topographic map to derive a traversable platform surface course between first and second locations of the topographic map. The autonomous operating method further includes deploying the swarm of multiple modular platforms toward the area and respectively controlling control units of each of the multiple modular platforms to autonomously arrange platforms of each of the multiple modular platforms into forming the traversable platform surface course.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

FIG. 5 is a side view of a modular platform at an angle with respect to neighboring modular platforms in accordance with embodiments of the present invention;

FIG. 6 is a side view of modular platforms in a step formation in accordance with embodiments of the present invention;

FIG. 7 is a schematic diagram illustrating components of a modular platform control unit in accordance with embodiments of the present invention;

Figure 1:
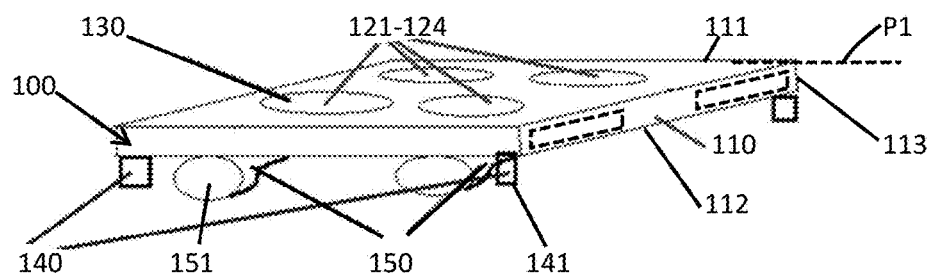
FIG. 1 is a perspective view of a modular platform in accordance with embodiments of the present invention.

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the disclosed embodiments, the various elements illustrated in the figures are provided with two or three digit reference numbers. With minor exceptions, the leftmost digit(s) of each reference number correspond to the figure in which its element is first illustrated.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

Turning now to an overview of technologies that are more specifically relevant to aspects of the invention, there are vehicles available that can serve as rescue vehicle or vehicles that can clear rubble from a disaster area. For example, an ambulance can be driven into a disaster area, loaded with injured people and then driven out of the disaster area so that the injured people can be treated at a hospital. As another example, a rescue robot or rubble clearing robot can autonomously enter the disaster area and, once there, assist with rescue operations or the clearing of rubble.

It is often the case, however, that access is prevented in certain disaster areas. Roads and walkways can be blocked by large amounts of rubble and debris that prevent rescue vehicles or rubble clearing vehicles from passing. Indeed, the large amounts of rubble can be built up into unstable mounds that cannot be traversed or otherwise climbed over. In these cases, the rescue and rubble clearing vehicles are of little use at least until the large amounts of rubble can be removed or cleared.

Turning now to an overview of the aspects of the invention, one or more embodiments of the invention address the above-described shortcomings of the prior art by providing for a modular platform that can be flown into a disaster area to mate or connect with other modular platforms so that the modular platforms can cooperatively form a traversable platform surface. Each modular platform has flight capability, an internal power supply, the ability to be stacked with other modular platforms and the ability to be connected to neighboring modular platforms. The modular platforms can also be deployed as part of a swarm of modular platforms that all work together to form the traversable platform surface.

The above-described aspects of the invention address the shortcomings of the prior art by provided a system and a method by which a modular platform or a swarm of modular platforms can be deployed into an area, such as a disaster area, to form a traversable platform surface by which rescue vehicles and other rubble clearing vehicles can pass into and out of the disaster area.

Turning now to a more detailed description of aspects of the present invention, FIG. 1 is a perspective view of a modular platform 100. The modular platform 100 includes a platform 110 that has an upper surface 111, which is formed to define a plane P1, a lower surface 112 and sidewalls 113. The sidewalls 113 extend between the upper surface 111 and the lower surface 112. The modular platform 100 also includes multiple rotors, such as first-fourth rotors 121-124 that are respectively embedded within corresponding corners of the platform 110. The first-fourth rotors 121-124 can be cyclically or collectively controlled to generate upward thrust at multiple positions (i.e., the corners of the platform 110) that are offset from a center of gravity of the platform 110.

In accordance with embodiments, the modular platform 100 can execute various flight maneuvers by controlling various operations of the first-fourth rotors 121-124. For example, a hover can be executed by rotating each of the first-fourth rotors 121-124 at the same speed whereas a roll maneuver can be executed by the first and second rotors 121 and 122 being rotated more quickly than the third and fourth rotors 123 and 124. A yaw maneuver might be executed by a roll maneuver, in which the first and second rotors 121 and 122 being rotated more quickly than the third and fourth rotors 123 and 124, which is followed by the second rotor 122 being slowed down and the first rotor 121 continuing to rotate quickly.

Figure 2:
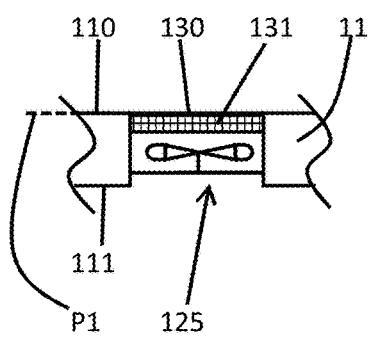
FIG. 2 is a side view of a rotor and a mesh covering of the modular platform of FIG. 1.

With continued reference to FIG. 1 and with additional reference to FIG. 2, the first-fourth rotors 121-124 may be operably disposed in apertures 125. The apertures 125 are defined to extend through the platform 110 from the upper surface 111 to the lower surface 112 and provide pathways through which thrust airflow can flow. As shown in FIG. 2, the modular platform 100 can further include mesh coverings 130. The mesh coverings 130 can be provided as an air-permeable mesh 131 and are disposed to cover each of the first-fourth rotors 121-124. The mesh coverings 130 are provided in the plane P1 of the upper surface 111 and, as such, the upper surface 111 and the mesh coverings 130 cooperatively form a traversable platform surface 132.

With continued reference to FIG. 1, the modular platform 100 further includes jack elements 140 and a lock mechanism 150. The jack elements 140 are configured to support the platform 110 above an underlying substrate, such as debris in a disaster area or another modular platform 110 in a stack formation (see FIG. 4). The jack elements 140 can each be provided as a hydraulic or pneumatic jack 141 that can be extended or retracted to increase or decrease a length of the jack element 140 (see FIG. 4). The lock mechanism 150 can be provided as a vacuum lock or a magnetically locking mechanism 151 and is configured to connect at least one of the sidewalls 113 to a neighboring substrate, such as a neighboring modular platform 110 so as to increase an overall size of the traversable platform surface 132 (see FIG. 3).

In accordance with various embodiments, the jack elements 140 can operate in conjunction with the lock mechanism 150. The jack elements 140 and the lock mechanism 150 can be vertically and/or horizontally communicative and, in addition, they can be articulable so as to support complex configurations and dynamic stresses during various operations.

Figure 3:
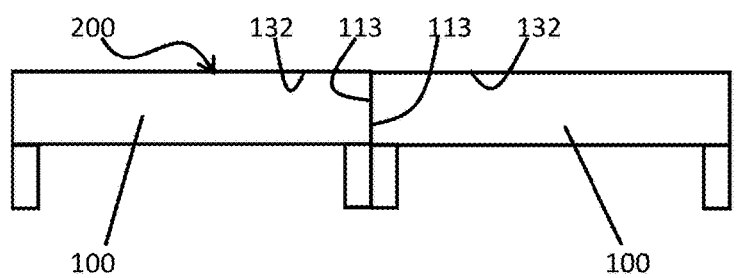
FIG. 3 is a side view of a modular platform forming a connection with a neighboring modular platform in accordance with embodiments of the present invention.

With reference to FIG. 3 and, as noted above, the lock mechanism 150 of the modular platform 100 can be used to connect a sidewall 113 to a sidewall 113 of a neighboring modular platform 100 to form a large traversable platform surface 200. Such a large traversable platform surface 200 could be useful in the transportation of relatively large equipment or vehicles, such as ambulances, into and out of disaster areas. That is, the relatively large traversable platform surface 200 effectively serves as a roadway for the large equipment or vehicles.

Figure 4:
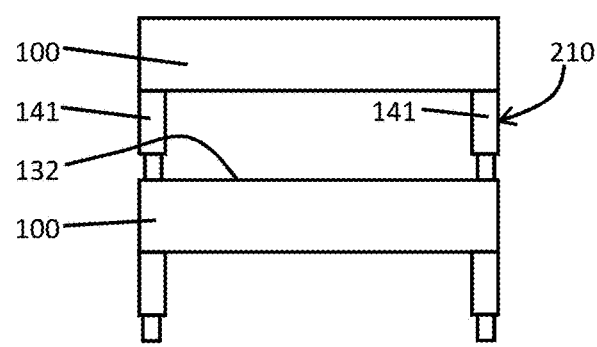
FIG. 4 is a side view of a stack of modular platforms in accordance with embodiments of the present invention.

With reference to FIG. 4 and, as noted above, the jack elements 140 of the modular platform 100 can be disposed on the traversable platform surface 132 of a platform 110 of another modular platform 100 to form a modular platform stack 210. This modular platform stack 210 can have a greater height that the modular platform 100 can have on its own and could be particularly useful in deployments of a swarm of modular platforms 100 toward the highly uneven ground where modular platform stacks 210 can be used to effectively even out the ground level.

With reference to FIG. 5, in an event multiple modular platforms 100 are deployed over slightly uneven or hilly ground, the jack elements 140 and the lock mechanism 150 (see FIG. 1) can be cooperatively controlled such that the traversable platform surfaces 132 of neighboring modular platforms 100 form an angle with respect to one another. Here, as long as the angle is not excessively large and a seam defined between adjacent traversable platform surfaces 132 is not excessively wide, the resulting angular formation 220 should be passable.

With reference to FIG. 6, in an event multiple modular platforms 100 are deployed over hilly ground, the jack elements 140 and the lock mechanism 150 can be cooperatively controlled such that the traversable platform surfaces 132 of neighboring modular platforms 100 form a step formation 230. The step formation 230 can be passable by vehicles as long as the individual steps are not excessively steep but it is more likely that the step formation would be particularly useful in providing solid footing for walking over ground that might otherwise be difficult to walk over.

With reference back to FIG. 1 and with additional reference to FIG. 7, the modular platform 100 can further include a power storage unit 160 and a control unit 170. The power storage unit 160 can be provided as a rechargeable battery 161, for example, and is embedded in the platform 110 and configured to power operations of the first-fourth rotors 121-124, the jack elements 140 and the lock mechanism 150. The control unit 170 is configured to control operations of the first-fourth rotors 121-124, the jack elements 140 and the lock mechanism 150. The control unit 170 can include a processing circuit 171, a memory unit 172, an input-output (I/O) unit 173 by which the processing circuit 171 communicates at least with other control units 170 of other modular platforms 100 and a servo control unit 174 by which the processing circuit 171 is operably coupled to the first-fourth rotors 121-124, the jack elements 140 and the lock mechanism 150. The memory unit 172 has executable instructions stored thereon, which are readable and executable by the processing circuit 171.

When the executable instructions are read and executed by the processing circuit 171, the executable instructions effectively cause the processing circuit 171 to inter-communicate with other control units 170 of other modular platforms 100 and to otherwise operate as disclosed herein. In an exemplary case, when the executable instructions are read and executed by the processing circuit 171, the executable instructions effectively cause the processing circuit 171 to independently control each of the first-fourth rotors 121-124, the jack elements 140 and the lock mechanism 150 and to inter-communicate with other control units 170 of other modular platforms 100 to thereby autonomously arrange the platforms 110 in one or more of the formations shown in FIGS. 3-6 (e.g., the large traversable platform surface 200 of FIG. 3, the modular platform stack 210 of FIG. 4, the angular formation 220 of FIG. 5 and the step formation 230 of FIG. 6).

Figure 8:
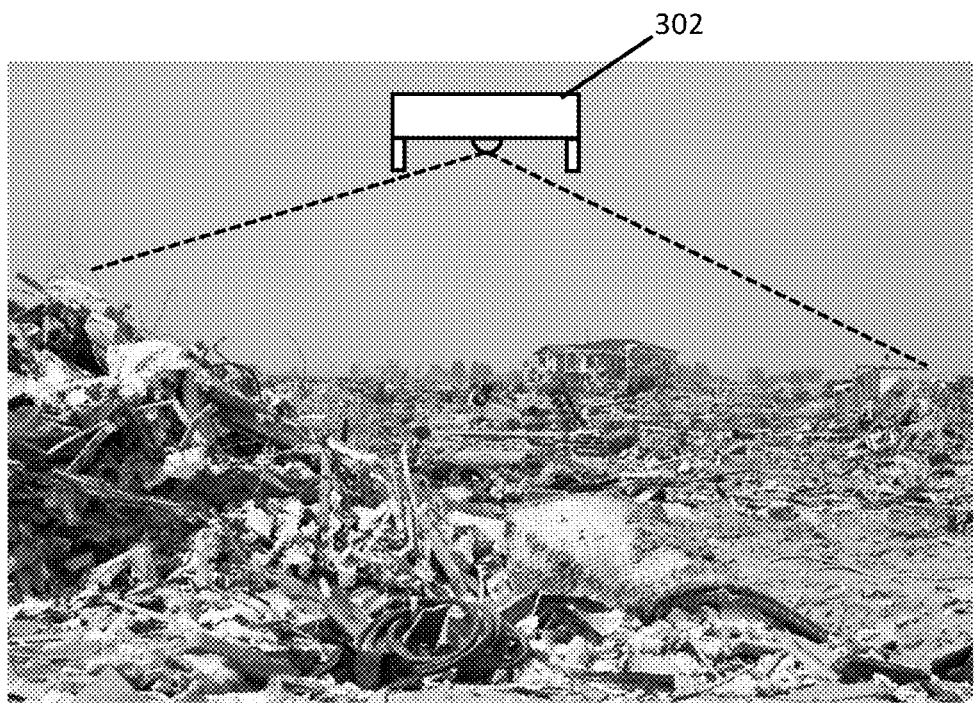
FIG. 8 is an illustration of a survey being taken of a disaster area.
Figure 9:
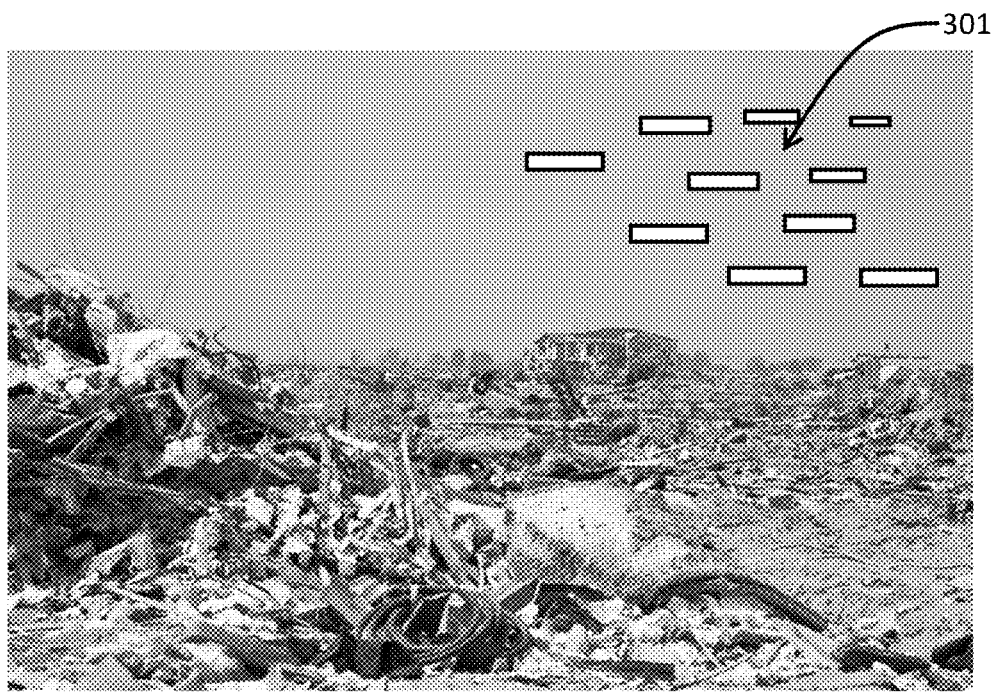
FIG. 9 is an illustration of a swarm of modular platforms being deployed toward the disaster area of FIG. 8 in accordance with embodiments of the present invention.
Figure 10:
FIG. 10 is an illustration of the swarm of modular platforms of FIG. 9 being controlled to form a traversable platform surface course across the disaster area in accordance with embodiments of the present invention.

With reference to FIGS. 8-10, a modular platform swarm 301 (see FIG. 9) is provided and includes a single modular platform 302 that can be initially deployed toward an area, such as a disaster area, to visually observe the area (see FIG. 8). The modular platform swarm 301 further includes multiple modular platforms 100 as described above where the control units 170 of the multiple modular platforms 100 are inter-communicative and configured to autonomously arrange the platforms 110 of the multiple modular platforms 100 to form a traversable platform surface 303 (see FIG. 10). As the area can be, for example, a disaster area of uneven and unknown topography, the control units 170 of the multiple modular platforms 100 are configured to autonomously arrange the multiple modular platforms 100 into at least the above-noted formations (e.g., the large traversable platform surface 200 of FIG. 3, the modular platform stack 210 of FIG. 4, the angular formation 220 of FIG. 5 and the step formation 230 of FIG. 6).

In accordance with some embodiments of the present invention, various standard or customized (i.e., operator designed at an initial time or in situ as a response to current conditions) configurations of the modular platform swarm 301 can be programmed into the various control units 170 of the multiple modular platforms 100. These configurations can dictate how the modular platform swarm 301 will adjust or respond to various conditions and environmental issues, such as terrain and topology, weather, etc. For example, the configurations can dictate that the modular platform swarm 301 will cooperatively seek to follow the terrain or topology closely or will seek to achieve maximum interlocking for stability regardless of terrain or topological conditions.

Figure 11:
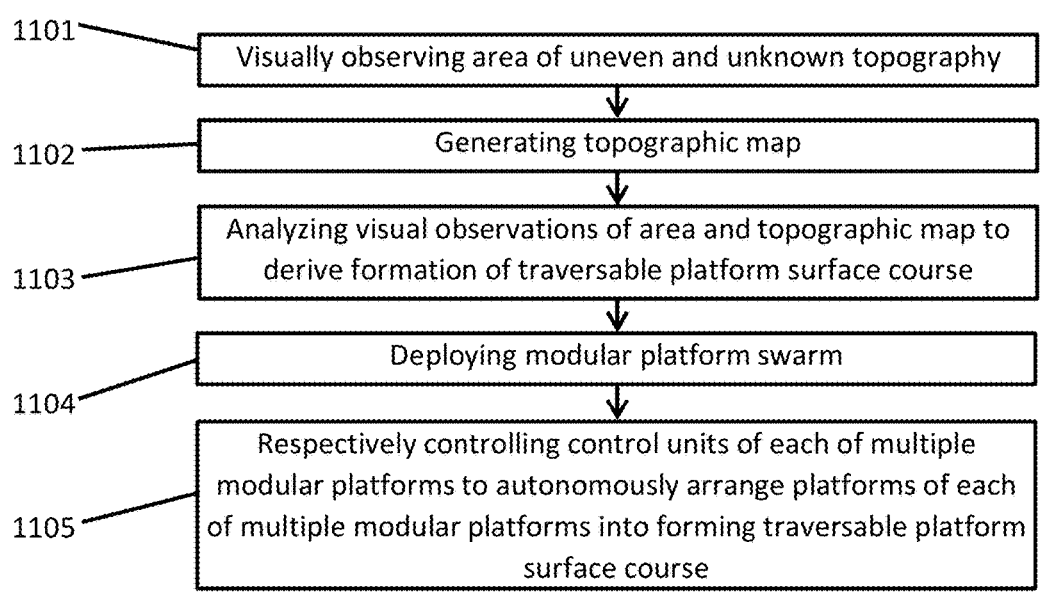
FIG. 11 is a flow diagram illustrating an autonomous operating method of a swarm of modular platforms in accordance with embodiments of the present invention.

With reference to FIG. 11, an autonomous operating method of the modular platform swarm 301 of FIGS. 8-10 is provided. The autonomous operating method includes visually observing an area of uneven and unknown topography by, for example, the single modular platform 301 of FIG. 8 (1101), generating a topographic map of the area 1102 based on the visual observations and analyzing the visual observations of the area and the topographic map to derive a formation of a traversable platform surface course between first and second locations of the topographic map (1103). In accordance with embodiments of the present invention, the analyzing of 1103 can include determining local stabilities for locating the traversable platform surface course.

Once the traversable platform surface course is effectively laid out or otherwise mapped, the autonomous operating method can include deploying or flying the modular platform swarm 301 toward the area (1104) and respectively controlling control units of each of the multiple modular platforms to autonomously arrange platforms of each of the multiple modular platforms into forming the traversable platform surface course (1105) with at least the above-noted formations (e.g., the large traversable platform surface 200 of FIG. 3, the modular platform stack 210 of FIG. 4, the angular formation 220 of FIG. 5 and the step formation 230 of FIG. 6).

Figure 12:
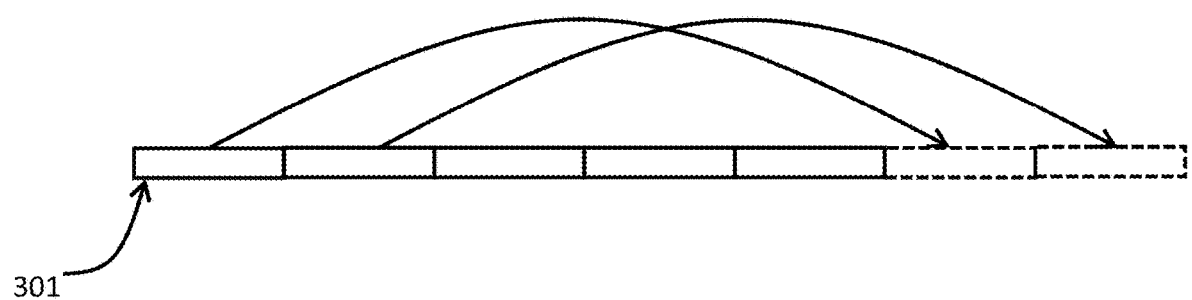
FIG. 12 is a schematic diagram illustrating an operation of modular platforms in accordance with embodiments of the present invention.

With reference to FIG. 12 and, in accordance with further embodiments of the present invention, in an event a number of available modular platforms in insufficient to form a traversable platform surface course for a given area, the autonomous operating method can further include the use and subsequent re-use of individual modular platforms. For example, in an event the analyzing of 1103 indicates that a traversable platform surface course requires seven modular platforms but the modular platform swarm 301 only includes five modular platforms, at least first and second ones of the modular platforms can be initially deployed at a start of the traversable platform surface course as vehicles move over that portion of the area and then can be subsequently deployed at an end of the traversable platform surface course as the vehicles move over that portion of the area. This use and subsequent re-use process can be continued repeatedly.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A modular platform, comprising:
   a platform having upper and lower surfaces;
   one or more propulsion units embedded within the platform to generate upward thrust;
   a mesh covering overlaying each of the one or more propulsion units in the upper surface;
   jack elements coupled to the lower surface and configured to support the platform above an underlying substrate;
   a lock mechanism configured to connect the platform to a neighboring platform;
   a power storage unit embedded in the platform and configured to power the one or more propulsion units, the jack elements and the lock mechanism; and
   a control unit embedded in the platform and configured to control operations of the one or more propulsion units, the jack elements and the lock mechanism.

2. The modular platform according to claim 1, wherein the one or more propulsion units comprise first-fourth rotors respectively disposed at corners of the platform.

3. The modular platform according to claim 1, wherein the mesh coverings form a traversable platform surface with the upper surface.

4. The modular platform according to claim 1, wherein the jack elements comprise hydraulic jacks respectively disposed at corners of the platform.

5. The modular platform according to claim 1, wherein the lock mechanism comprises a vacuum or magnetic lock mechanism.

6. The modular platform according to claim 1, wherein each of the one or more propulsion units and each of the jack elements is independently controllable.

7. The modular platform according to claim 1, wherein the control unit is inter-communicative with a partner control unit of at least one other modular platform.

8. The modular platform according to claim 7, wherein the control unit and the partner control unit of the at least one other modular platform are configured to autonomously arrange the platform and a platform of the at least one of modular platform to form a traversable platform surface.

9. A modular platform swarm, comprising:
   multiple modular platforms, each of the multiple modular platforms comprising:
   a platform;
   multiple rotors embedded within the platform to generate upward thrust offset from a center of gravity of the platform;
   mesh coverings covering each of the multiple rotors;
   jack elements configured to support the platform above an underlying substrate;
   a lock mechanism configured to connect the platform to a neighboring substrate;
   a power storage unit embedded in the platform and configured to power the multiple rotors, the jack elements and the lock mechanism; and
   a control unit configured to control operations of the multiple rotors, the jack elements and the lock mechanism,
   the control units of the multiple modular platforms being inter-communicative and configured to autonomously arrange the platforms of the multiple modular platforms to form a traversable platform surface.

10. The modular platform swarm according to claim 9, wherein the multiple rotors of each of the multiple modular platforms comprise first-fourth rotors respectively disposed at corners of the corresponding platform.

11. The modular platform swarm according to claim 9, wherein the mesh coverings of each of the multiple modular platforms form a traversable platform surface with an upper surface of the corresponding platform.

12. The modular platform swarm according to claim 9, wherein the jack elements of each of the multiple modular platforms comprise hydraulic jacks respectively disposed at corners of the corresponding platform.

13. The modular platform swarm according to claim 9, wherein the lock mechanism of each of the multiple modular platforms comprises a vacuum or magnetic lock mechanism.

14. The modular platform swarm according to claim 9, wherein each of the multiple rotors and each of the jack elements of each of the multiple modular platforms is independently controllable.

15. The modular platform swarm according to claim 9, wherein the traversable platform surface traverses a disaster area of uneven and unknown topography.

16. The modular platform swarm according to claim 9, wherein the control units of the multiple modular platforms are configured to:
- autonomously arrange a stack of multiple modular platforms,
- autonomously arrange multiple modular platforms in a step formation, and
- autonomously arrange a first one of the multiple modular platforms at an angle relative to a neighboring one of the multiple modular platforms.

17. An autonomous operating method of a swarm of multiple modular platforms, the autonomous operating method comprising:
- visually observing an area of uneven and unknown topography;
- generating a topographic map of the area;
- analyzing visual observations of the area and the topographic map to derive a traversable platform surface course between first and second locations of the topographic map;
- deploying the swarm of multiple modular platforms toward the area; and
- respectively controlling control units of each of the multiple modular platforms to autonomously arrange platforms of each of the multiple modular platforms into forming the traversable platform surface course.

18. The autonomous operating method according to claim 17, wherein the analyzing comprises determining local stabilities for locating the traversable platform surface course and the deploying comprises flying the multiple modular platforms toward the area.

19. The autonomous operating method according to claim 17, wherein the respectively controlling comprises:
- autonomously arranging a stack of multiple modular platforms;
- autonomously arranging multiple modular platforms in a step formation; and
- autonomously arranging a first one of the multiple modular platforms at an angle relative to a neighboring one of the multiple modular platforms.

20. The autonomous operating method according to claim 17, wherein the respectively controlling comprises:
- using one or more of the multiple modular platforms at first sections of the traversable platform surface course; and
- re-using the one or more of the multiple modular platforms at second sections of the traversable platform surface course.

* * * * *